(12) United States Patent
Stephens et al.

(10) Patent No.: US 8,225,818 B1
(45) Date of Patent: Jul. 24, 2012

(54) HYDRAULIC VALVE ARRANGEMENT WITH AN ANNULAR CHECK VALVE ELEMENT

(75) Inventors: Kirt Nathaniel Stephens, New Berlin, WI (US); Kathryn Irene Bacon, Waukesha, WI (US)

(73) Assignee: Incova Technologies, Inc., Waukesha, WI (US)

( * ) Notice: Subject to any disclaimer, the term of this patent is extended or adjusted under 35 U.S.C. 154(b) by 0 days.

(21) Appl. No.: 13/053,823

(22) Filed: Mar. 22, 2011

(51) Int. Cl.
*F16K 15/14* (2006.01)
*F15B 13/044* (2006.01)
(52) U.S. Cl. .............. 137/625.68; 137/512.15; 137/860
(58) Field of Classification Search ............. 137/512.15, 137/852, 860, 625.68
See application file for complete search history.

(56) References Cited

U.S. PATENT DOCUMENTS

| 894,286 | A | | 7/1908 | Reineking | |
|---|---|---|---|---|---|
| 1,368,315 | A | * | 2/1921 | Wygodsky | 137/860 |
| 1,746,855 | A | | 2/1930 | French | |
| 2,918,941 | A | * | 12/1959 | Whiting | 137/512.15 |
| 3,882,891 | A | * | 5/1975 | Viles et al. | 137/512.15 |
| 4,241,758 | A | * | 12/1980 | Eiermann | 137/512.15 |
| 6,899,126 | B2 | | 5/2005 | Weigand et al. | |
| 7,121,553 | B2 | | 10/2006 | Cornea et al. | |
| 7,240,768 | B2 | | 7/2007 | Sageman | |
| 7,600,531 | B2 | | 10/2009 | Patze et al. | |
| 8,127,790 | B2 | * | 3/2012 | Van Weelden et al. | 137/625.65 |

FOREIGN PATENT DOCUMENTS

DE 3829698 A1 3/1989

* cited by examiner

*Primary Examiner* — John Rivell
(74) *Attorney, Agent, or Firm* — Quarles & Brady LLP; George E. Haas

(57) ABSTRACT

A valve arrangement includes a valve body with a bore within which a spool slides to control fluid flow between first and second ports. The bore has an annular recess into which the first port opens and in which is located a check valve band formed by a strip with overlapping ends. Pressure in the first port causes the check valve band to contract and expand circumferentially to open and close the first port. A stop is located near one end of the strip and is engaged by the other end to limit the amount of contraction of the check valve band. Thus the diameter of the check valve band cannot contract smaller than the diameter of the bore, thereby retaining the check valve ring in the annular recess. The check valve band optionally has a plurality of tabs projecting from each edge and engaging side walls of the annular recess.

23 Claims, 4 Drawing Sheets

HYDRAULIC VALVE ARRANGEMENT WITH AN ANNULAR CHECK VALVE ELEMENT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to spool valves, and more particularly to such valves that have an integral check valve for controlling fluid flow through the valve.

2. Description of the Related Art

A wide variety of machines have moveable members that are operated by an hydraulic actuator. For example an internal combustion engine has a camshaft which is mechanically coupled to rotate with the crankshaft and which opens and closed cylinder intake and exhaust valves. Traditionally the camshaft timing was fixed at a setting that produced the best operation at all engine operating speeds. However, it has been recognized that engine performance can be improved if the valve timing varies as a function of engine speed, engine load, and other factors. Thus a hydraulic actuator is being used on some engines to vary the coupling relationship of the camshaft to the crankshaft and a solenoid operated valve is employed to control the application of pressurized fluid to operate the hydraulic actuator.

Hydraulic systems for controlling engine operation included check valves that allowed fluid to flow in only one direction. For example, a separate check valve connected in a conduit coupled to an inlet or an outlet of solenoid operated valve permitted fluid to flow only to or from that latter valve. Providing the solenoid operated valve and check valve as separate components increased the number of parts to connect together in the hydraulic system. Therefore, it is desirable to integrate the check valve into the solenoid operated valve to simplify connection of the hydraulic system.

SUMMARY OF THE INVENTION

A valve arrangement comprises a valve body with a bore that has an annular recess into which a fluid port opens. An annular band is moveably received in the annular recess. The annular band is formed by a strip that has a first end and a second end which overlap in a manner that allows the circumference of the band to contract and expand. In a normal state, the annular band is expanded circumferentially and diametrically against a wall of the annular recess and closes fluid communication between the first fluid port and the bore. In another state, pressure in the fluid port causes contraction of the band away from the wall, thereby providing a fluid path between the fluid port and the bore.

A stop is secured to either the valve body or the annular band for limiting contraction of the band. The stop limits the amount that the diameter of the band can decrease under the pressure and prevents that diameter from becoming smaller than the diameter of the bore. As a result the check valve band is captivated in the annular recess.

In one embodiment, the stop is formed near the second end of the strip and the first end engages the stop to limit contraction of the strip. For example, the stop may be a tongue that is bent away from the main portion of the band. Now as the band contracts, the first end slides over the second end until striking the tongue, at which point the contraction is arrested.

In another embodiment, the strip has a first elongated aperture adjacent the first end and a second elongated aperture adjacent the second end. When the strip is formed into the band, the first and second elongated apertures at least partially overlap. Upon being installed in the annular recess of the valve body, a pin, that is secured in a hole of the valve body, projects through both the first and second elongated apertures to form the stop.

In one aspect of the invention, the strip has two longitudinal edges that extend between the first and second ends. A plurality of tabs project outward from both longitudinal edges for engaging side walls of the annular recess. The tabs maintain the ring generally centered in the annular recess and the voids between the tabs provide paths through which fluid flows when the ring contracts to open the first fluid port.

DETAILED DESCRIPTION OF THE INVENTION

Figure 1:
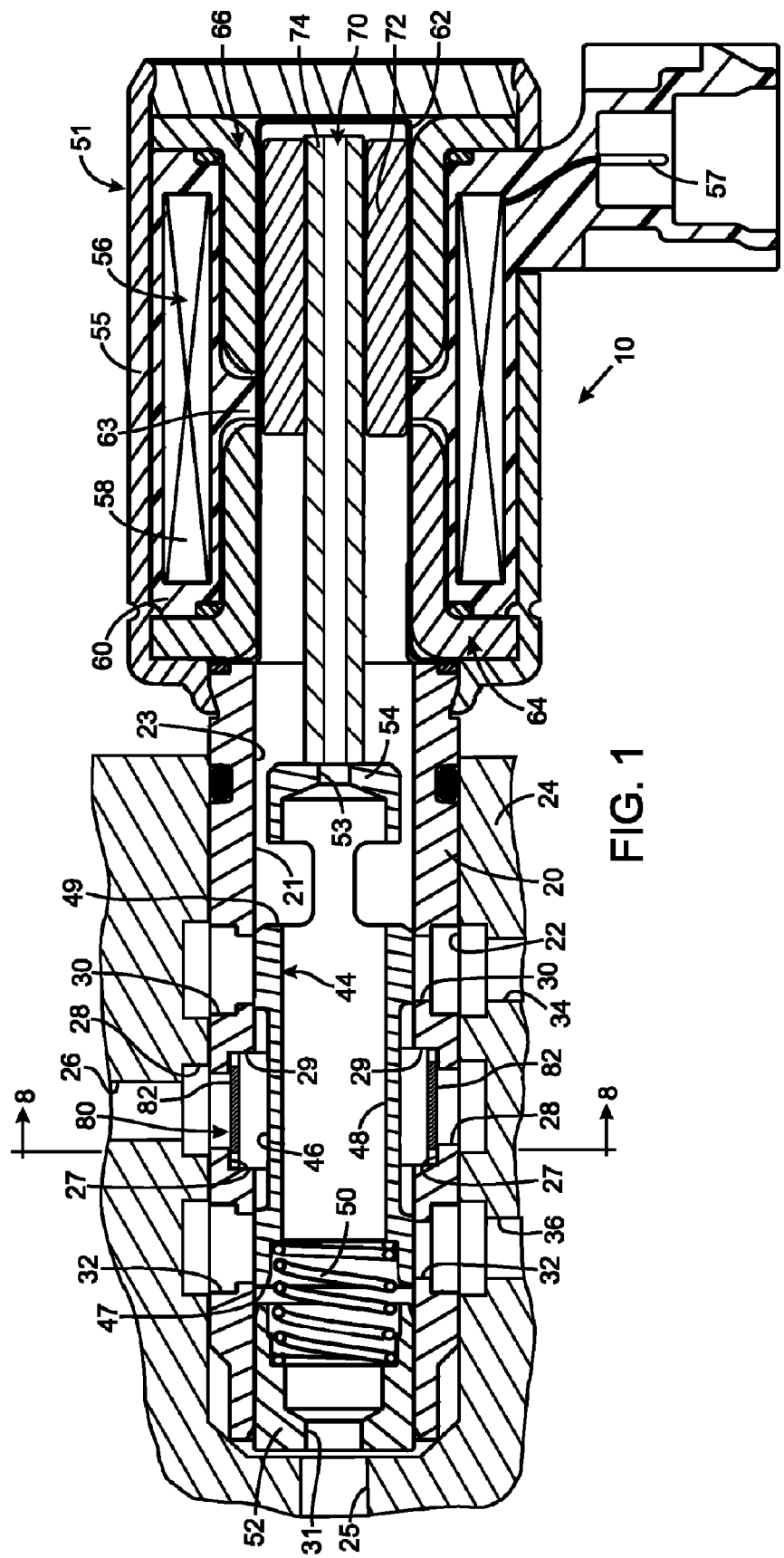
FIG. 1 is a longitudinal cross sectional view through an electrohydraulic valve that incorporates a check valve according the present invention.

The present invention will be described in the context of an exemplary electrohydraulic valve 10 depicted in FIG. 1, however it should be understood that the invention can be practiced with other types of valves, The electrohydraulic valve 10 has a tubular valve body 20 that during use is inserted into an aperture 22 in a manifold 24. The tubular valve body 20 has a longitudinal bore 21 into which a plurality of ports open. A supply passage 26 in the manifold 24 conveys pressurized fluid from a pump or other source to a plurality of inlet ports 28 in the valve body 20. Each inlet port 28 opens through an inner curved surface 27 into an annular recess 29 formed in the surface 23 of the valve body's longitudinal bore 21. Although the exemplary valve 10 has six inlet ports 28, a lesser or greater number of inlet ports may be provided. A plurality of first and second workports 30 and 32 in the tubular valve body 20 provide fluid paths between the longitudinal bore 21 and manifold passages 34 and 36 that lead to a hydraulic actuator that is driven by the fluid. At the inner end of the manifold aperture 22, a return passage 25 communicates with an outlet port 31 in the valve body to convey fluid back to a tank of the hydraulic system.

A spool 44 is slideably received within the bore 21 of the valve body 20 and has an exterior annular notch 46 which, in selected positions of the spool, provides fluid paths between the inlet port 28 and the two workports 30 and 32 and thus between the associated manifold passages. In a middle position of the spool travel, that is illustrated in FIG. 1, the inlet port 28 is closed from both workports 30 and 32 which also are blocked off by lands on the spool 44. A central passage 48 extends between the opposite ends 47 and 49 of the spool 44. A head 54 projects from the outward end 49 of the valve spool 44 and has an aperture 53 there through. A spring 50 biases the inward end of the spool 44 away from a nose piece 52 at a first end of the valve body 20 at which the outlet port 31 is located.

The valve 10 also includes a linear actuator 51 attached to the opposite second end of the valve body 20. The linear actuator 51 has a metal outer housing 55 that surrounds a solenoid coil 58 wound in a non-magnetic bobbin 60, preferably made of plastic. The solenoid coil 58 is driven by a pulse width modulated (PWM) electrical signal having a duty cycle that is varied in a conventional manner to move the spool 44 to different desired positions in the valve body 20. The PWM signal is applied to the linear actuator 51 via a connector 57.

The linear actuator 51 further includes two magnetically conductive pole pieces 64 and 66 that extend into opposite ends of the bobbin 60 with their interior ends being spaced apart. An inwardly projecting annular rib 63 of the bobbin magnetically separates the first and second pole pieces 64 and 66. A liner tube 62, preferably of stainless steel, is inserted through the first and second pole pieces 64 and 66 and has an open end facing the valve body 20. The opposite end of the liner tube 62 is closed. The liner tube 62 acts as a magnetic barrier between the pole pieces and as a guide for a sliding plunger 70. The solenoid coil 58, the bobbin 60, the first and second pole pieces 64 and 66, and the liner tube 62 form a solenoid coil assembly 56.

The actuator plunger 70 is slideably located within the aperture of the liner tube 62 and includes an armature 72 of ferromagnetic material. A tubular push member 74 is received within a longitudinal aperture through the armature 72 and is staked thereto. The push member 74 projects outward from the open end of the liner tube 62 and abuts the head 54 of the valve spool 44.

Figure 7:
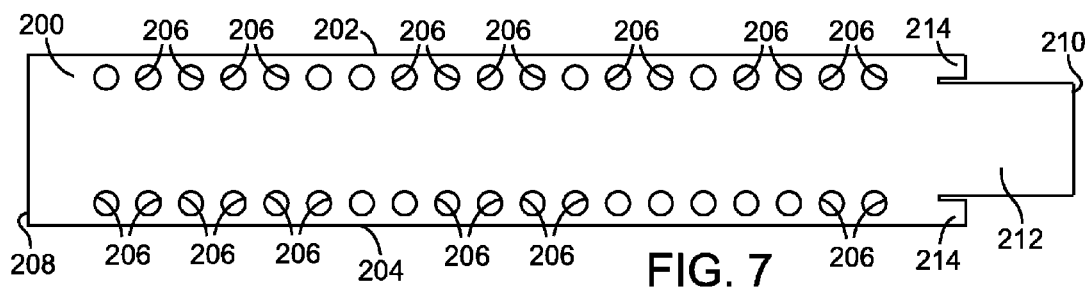
FIG. 7 illustrates a third type of plate for the check valve element.
Figure 8:
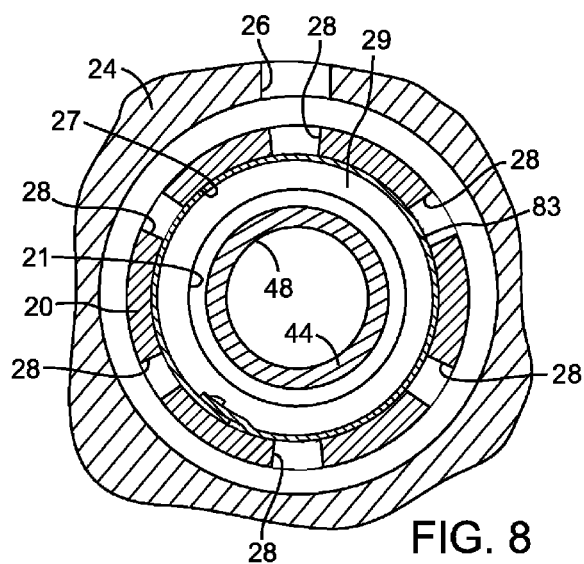
FIG. 8 is a radial cross sectional view through the electrohydraulic valve along line 8-8 in FIG. 1, wherein the check valve is in the closed position.

With reference to FIGS. 1, 7 and 8, a check valve 80 is located in the annular recess 29 to restrict the flow of fluid only in a direction from the inlet ports 28 into the longitudinal bore 21 of the valve body 20. The check valve 80 prevents the flow of fluid in the opposite direction, as will be described. The check valve 80 comprises a metal strip 82 bent into a ring that has a tubular shape with overlapping ends, thereby forming a resilient annular band 83.

Figure 2:
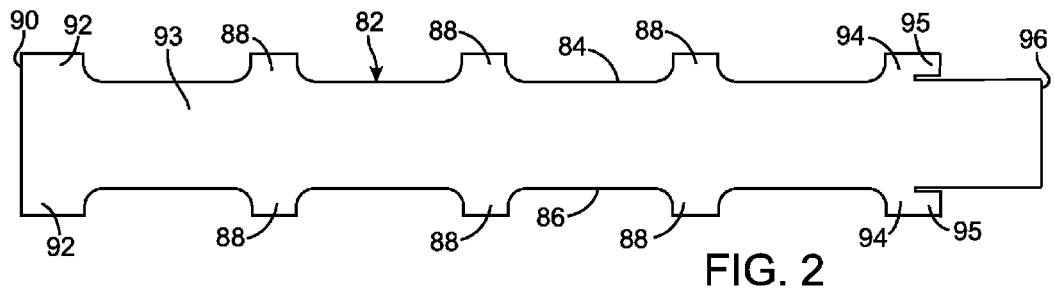
FIG. 2 illustrates a first type of plate used to form an element of the check valve.
Figure 3:
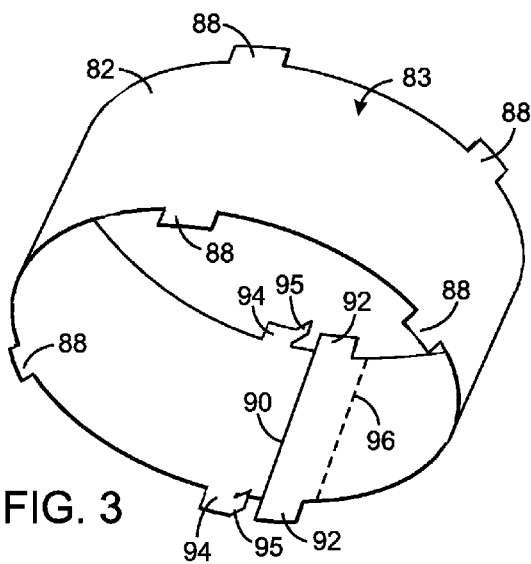
FIG. 3 shows the plate bent into an annular band for insertion into the electrohydraulic valve, wherein the band is depicted in a normal expanded state as occurs in a closed position of the check valve.
Figure 4:
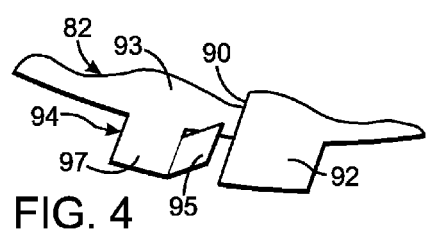
FIG. 4 is an enlarged portion of the plate showing the details of a stop that limits contraction of the annular band.

With reference to FIGS. 2-4, the metal strip 82 has first end 90 and a second end 96 between which extend a pair of parallel longitudinal edges 84 and 86. At the first end 90 of the strip, a pair of end tabs 92 project outwardly from the two longitudinal edges 84 and 86. A plurality of spaced apart tabs 88 project outwardly from both longitudinal edges 84 and 86 along the length of the strip. Although the exemplary strip 82 has three tabs 88 along each of the two edges 84 and 86, a greater or lesser number of tabs may be used.

Figure 5:
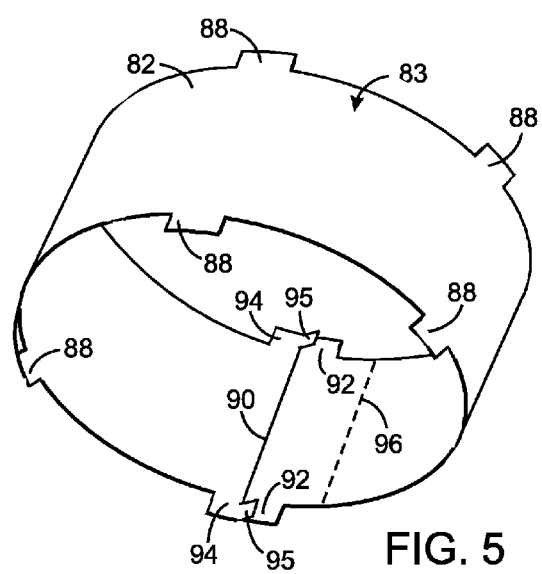
FIG. 5 shows the annular band is a circumferentially contracted state as occurs in an open position of the check valve.

A pair of L-shaped limit tabs 94 are located along each longitudinal edge 84 and 86 inwardly from the second end 96. Each limit tab 94 has a tongue 95 extending toward the second end and bent inwardly from the inner circumference of the annular band 83. With particular reference to FIG. 3, when the strip 82 is formed into the tubular band 83, the first end 90 extends inside the second end 96 in an overlapping manner. In this configuration, the end tabs 92 are spaced a small distance from the limit tabs 94. As shown in greater detail in FIG. 4, each limit tab 94 has a first portion 97 contiguous with and parallel to the surface 93 of the strip and has a second portion, forming the tongue 95 that is bent inward so that the end tab 92 at the first end of the strip can slide under the tongues. As will be described hereinafter, the tongues 95 act as stops that restrict the amount that the end tabs 92 can slide along the band, thereby limiting the amount of circumferential contraction of the band 83, as shown in FIG. 5.

Figure 6:
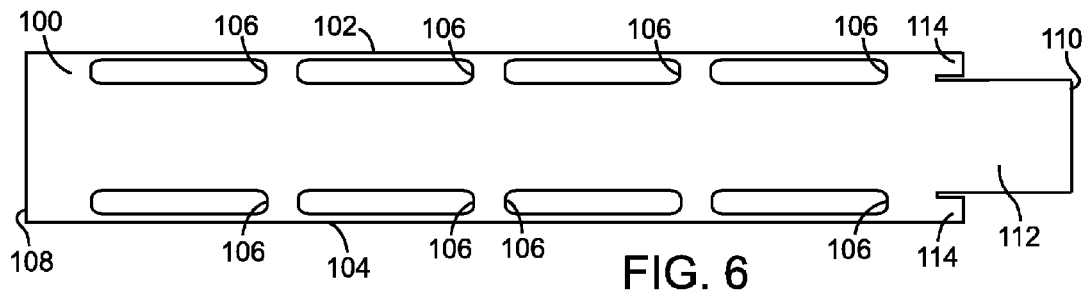
FIG. 6 illustrates a second type of plate for the check valve element.

FIG. 6 depicts an alternative second strip 100 for forming a check valve band that does not have individual tabs 88 projecting from the longitudinal edges, as with the first strip 82. The second strip 100 has a uniform width defined by the longitudinal edges 102 and 104. Separate sets of aligned, elongated apertures 106 extend entirely through the second strip, spaced inwardly a small distance from each of the longitudinal edges 102 and 104. A first end 108 extends between the first and second longitudinal edges 102 and 104. An opposite second end 110 of the band has a reduced width section 112. A pair of tongues 114 extend toward the second end 110 from the terminus of each of longitudinal edge 102 and 104 and parallel with the reduced width end section 112. When the second strip 110 is bent into a tubular band, the first end 108 overlaps inside the second end 110 and the two tongues 114 are bent inward. Thus, during the operation of the check valve when the circumference and diameter of the band reduces due to pressure acting thereon, as will be described, the first end 108 slides under the two tongues 114 which limit the amount of that circumferential contraction.

As shown in FIG. 7, a third type of strip 200 for forming the check valve band has a plurality of circular apertures 206 extending along both longitudinal edges 202 and 204 between the first and second ends 208 and 210. A pair of tongues 214 extend toward the second end 210 parallel with the reduced width end section 212. The third type of strip 200 bent into a ring with the ends 208 and 210 to form an annular check valve band.

With reference to FIGS. 1 and 2, the components of the valve body 20 are assembled by bending the strip 82 into the tubular band 83. Then the band 83 is manually contracted so that the first end 90 extends over the limit tabs 94, thereby reducing the band to an abnormally small diameter. This reduced size enables the band 83 to be inserted into the bore 21 of the valve body 20. When the inserted band reaches the annular recess 29, it is released and the resiliency of the metal strip 82 causes the band 83 to spring outward expanding the diameter and the circumference until it rests against the inner curved surface 27 of that recess, as illustrated in FIG. 7. In this position, referred to as the closed position of the check valve 80 and the normal state of the band 83, the band closes all the inlet ports 28. The resiliency of the metal returns the band to this normal state in the absence of forces acting thereon. As used herein the term "normal state" refers to the configuration that the annular band 83 has when the hydraulic valve 10 is closed or when pressures in the supply passage 26 and in the annular notch 46 of the spool 44 are equal. In the normal state, the end tabs 92 are spaced away from the tongues 95 of the limit tabs 94 as illustrated.

Referring again to FIG. 1, the valve assembly continues by inserting the spool 44, the spring 50 and the nose piece 52 into the bore 21 of the valve body 20. The remainder of the electrohydraulic valve 10 is assembled in a conventional manner.

Figure 9:
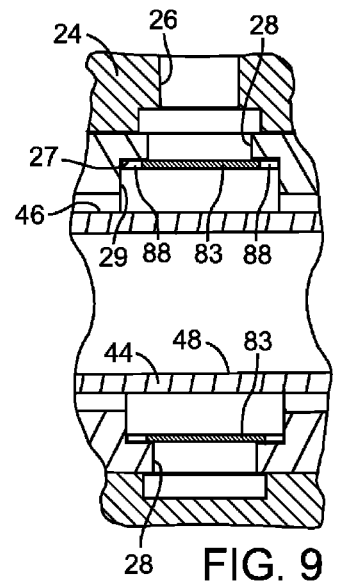
FIG. 9 is a partial longitudinal cross sectional view with the check valve in the closed position.

During operation of the electrohydraulic valve 10, the spool 44 is selectively moved within the valve body bore 21 to open and close paths between the inlet ports 28 and the workports 30 or 32. When one of those paths is open, if pressure in the associated workport is greater than pressure in the inlet ports, the band 83 is held against the inner curved surface 27, closing the inlet ports 28, as depicted in FIGS. 8 and 9, thereby preventing the backward flow of fluid into the inlet ports and the supply passage 26.

Figure 10:
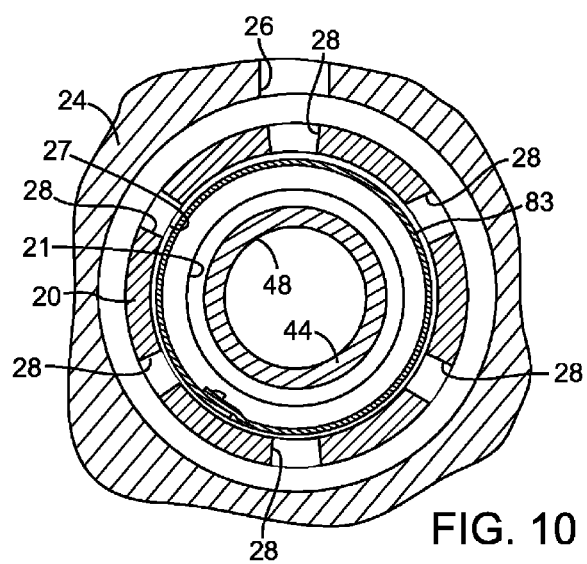
FIG. 10 is a radial cross sectional view through the electrohydraulic valve similar to FIG. 7, except with the check valve in the open position.
Figure 11:
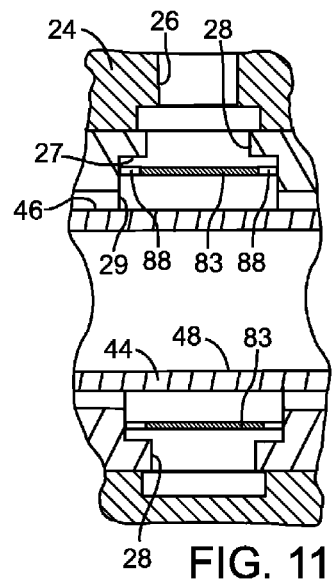
FIG. 11 is a partial longitudinal cross sectional view with the check valve in the open position.

Alternatively, when the pressure in the supply passage 26 is greater than that in the associated workport 30 or 32, the greater pressure is communicated around the valve body 20 and into each of the inlet ports 28. This applies a greater force to the outer circumference of the check valve band 83, thereby contracting the band diametrically and circumferentially away from the inner curved surface 27 of the annular recess 29 in the valve body, as depicted in FIGS. 10 and 11. That contraction opens all the inlet ports 28. As shown particularly in FIG. 11, the tabs 88 along the longitudinal edges, maintain the band 83 generally centered between the side walls of the annular recess 29. In the contracted state, the gaps or voids between the adjacent tabs 88 provide paths through which the fluid flows from the inlet ports 28 into the exterior notch 46 around the valve spool 44 and onward to the respective workport 30 or 32. The elongated apertures 106 and 206 in the second and third strips 100 and 200, respectively, serve a similar function as the voids between the tabs 88 in the first strip 82 for providing paths for the fluid flow. In the open position of the spool 44, fluid flows from the other workport 32 or 30 through the outlet port 31 and the return passage 25 to the tank of the hydraulic system.

If in the open state, the pressure at the workport 30 or 32 becomes greater than the supply passage pressure, a greater force in applied to the inner circumferential surface of the band 83. This causes the band 83 to expand outward against the curved surface 27 of the annular recess 29, thereby closing all the inlet ports 28. As a result, fluid from the workports is prevented from flowing backwards through the valve 10 and into the supply passage 26.

Sometimes in the open state of the valve 10, a extremely great pressure differential occurs between the inlet ports 28 and the notch 46 in the valve spool. This extreme pressure differential could produce an extensive contraction of the band 83 in which its diameter is less than the diameter of the longitudinal bore 21 in the valve body 20. In such a reduced diameter state, the band 83 could move out of the annular recess 29 and engage the curved surface 23 of the longitudinal bore. In this circumstance, the check valve 80 becomes stuck in that position and is unable to close the inlet ports 28 should the pressure differential reverse.

In order to prevent the check valve 80 from becoming stuck in this manner, the tongues 95 act as stops that restrict the amount of circumferential contraction of the band 83. As shown in FIG. 5, the contraction of the band 83 is limited by the end tabs 92 striking the tongues 95 in the overlapping portion of the band. By limiting band contraction in this manner, the minimum diameter to which the band can contract is held to be greater than the diameter of the longitudinal bore 21 in the valve body 20. As a consequence, the band 83 is restricted from contracting to a degree in which it could come out of the annular recess 29 and get hung up on the curved surface 23 of the valve body's longitudinal bore.

Figure 12:
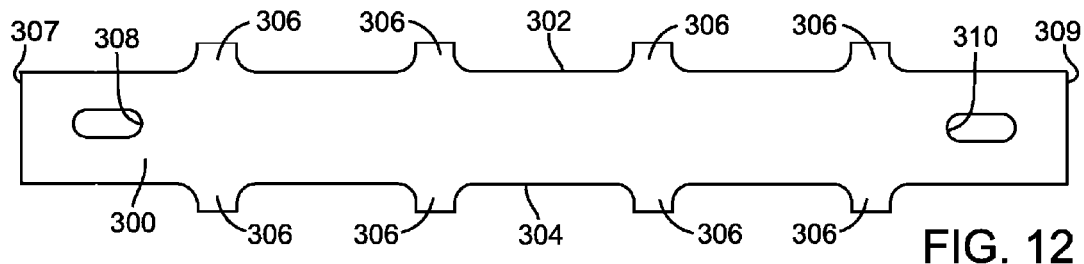
FIG. 12 a fourth type of plate for the check valve element.

FIG. 12 depicts an alternative version of a strip 300 for a check valve band which does not have a tongue type stop. This resilient metal strip 300 has first end 307 and a second end 309 between which extend a pair of parallel longitudinal edges 302 and 304. A plurality of spaced apart tabs 306 project outwardly along the length of the strip from both longitudinal edges 302 and 304. Although the strip 300 has four tabs 306 along each edge 302 and 304, a greater or lesser number of tabs may be used. A first elongated aperture 308 is spaced inward near the first end 307 and is centered across the width of the strip 300. A second elongated aperture 310 is spaced inward near the second 309 end and also is centered widthwise.

Figure 13:
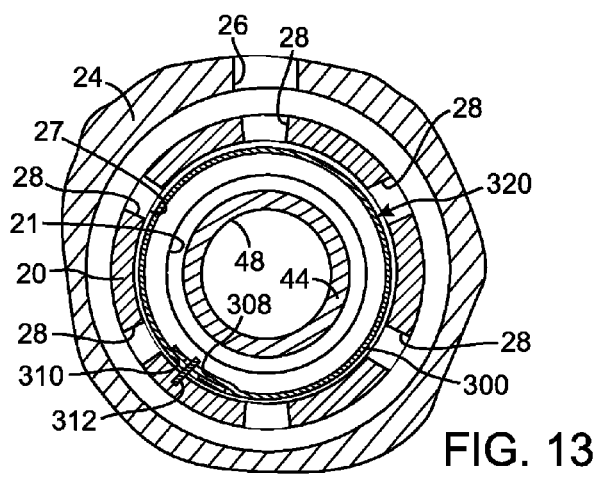
FIG. 13 is a radial cross sectional view through a electrohydraulic valve that has a check valve band formed from the fourth type of plate.

With additional reference to FIG. 13, when the strip 300 is bent into a ring to form a check valve band 320 and the two ends overlap, the first and second elongated apertures 308 and 310 also overlap. When that band 320 is inserted into the annular recess 29 in the bore 21 of the valve body 20, a pin 312 is inserted through the elongated apertures 308 and 310 and secured into a hole in the inner curved surface 27 of the annular recess 29. When the check valve opens due to contraction of the band 320, the amount of that contraction is limited by the ends of the first and second elongated apertures 308 and 310 striking the pin 312. Thus in this version of the check valve, the pin acts as a stop that restricts contraction of the band.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A valve arrangement comprising:
   a valve body having a bore with an annular recess and having a first fluid port opening into the annular recess;
   an annular band formed by a strip that has a first end and a second end which overlap, the band being located in the annular recess and having a normal state in which the band closes fluid communication between the first fluid port and the bore, wherein pressure in the first fluid port causes the band to contract in size thereby providing a fluid path between the first fluid port and the bore; and
   a stop attached to one of the valve body and the annular band for limiting contraction of the band.

2. The valve arrangement as recited in claim 1 wherein the stop is attached to the band proximate the second end wherein the stop becomes engaged by the first end to limit contraction of the band.

3. The valve arrangement as recited in claim 1 wherein the strip has a first aperture proximate the first end and has a second aperture proximate the second end; and the stop comprises a member attached to the valve body and extending into the first and second apertures.

4. The valve arrangement as recited in claim 1 wherein the stop limits contraction so that the band is unable to move out of the annular recess regardless of the magnitude of pressure in the first fluid port.

5. The valve arrangement as recited in claim 1 wherein the stop comprises a tongue that projects from a surface of the strip and the first end of the strip abuts the tongue to limit contraction of the band.

6. The valve arrangement as recited in claim 1 wherein the strip has first and second edges extending between the first end and the second end thereby bordering a surface of the strip; and the stop comprises a portion projecting outward from the first longitudinal edge and parallel to the surface and has a second portion that is non-parallel to the surface.

7. The valve arrangement as recited in claim 6 wherein during contraction of the band, the first end slides along the surface until abutting the stop.

8. The valve arrangement as recited in claim 1 wherein when the first end engages the stop, the band has a diameter that is greater than a diameter of the bore.

9. The valve arrangement as recited in claim 1 wherein the strip further comprises first and second edges extending between the first end and the second end; and a plurality of tabs projecting outwardly from and spaced along at least one of the first and second edges.

10. The valve arrangement as recited in claim 9 wherein the plurality of tabs engages at least one wall of the annular recess.

11. The valve arrangement as recited in claim 9 wherein voids are defined between adjacent ones of the plurality of tabs and in a contracted stated of the band, the voids form part of the fluid path.

12. The valve arrangement as recited in claim 1 further comprising a valve spool slidably received in the bore of the body.

13. The valve arrangement as recited in claim 1 wherein the strip further comprises first and second edges extending between the first end and the second end; a plurality of apertures extend through the strip and spaced adjacent to and along at least one of the first and second edges.

14. A valve arrangement comprising:
a valve body having a bore with an annular recess, a first fluid port opening into the annular recess, and a second port opening into the bore;
a spool slidably received in the bore and selectively controlling fluid flow between the first fluid port and the second fluid port; and
an annular band formed by a strip that has first and second ends which overlap, the band is located in the annular recess and has a normal state in which the band closes fluid communication between the first fluid port and the bore, wherein pressure in the first fluid port causes the band to reduce in size thereby opening a fluid path between the first fluid port and the bore, the band further comprising a stop proximate to the second end and which is adapted to be engaged by the first end to limit reduction of the size of the band.

15. The valve arrangement as recited in claim 14 wherein the strip has first and second edges extending between the first and second ends, and further having a plurality of tabs projecting outwardly from and spaced along each of the first and second edges.

16. The valve arrangement as recited in claim 15 wherein the plurality of tabs engages walls of the annular recess.

17. The valve arrangement as recited in claim 15 wherein voids are defined between adjacent ones of the plurality of tabs and in a reduced size of the band, the voids form part of the fluid path.

18. The valve arrangement as recited in claim 14 wherein the strip further comprises first and second edges extending between the first end and the second end; and a plurality of apertures spaced proximate to and along at least one of the first and second edges.

19. The valve arrangement as recited in claim 14 wherein the stop limits reduction in size so that the band is unable to move out entirely of the annular recess regardless of the pressure in the first fluid port.

20. The valve arrangement as recited in claim 14 wherein the stop comprises a member that is raised from a surface of the strip and the first end abuts the member to limit reduction of the size of the band.

21. The valve arrangement as recited in claim 14 wherein the stop comprises a first portion projecting outward from the first longitudinal edge and parallel to a surface of the strip and has a second portion that is non-parallel to the surface.

22. The valve arrangement as recited in claim 14 wherein during reduction in size, the first end of the band slides along a surface of the strip until abutting the stop.

23. The valve arrangement as recited in claim 14 wherein, when the first end engages the stop, the band has a diameter that is greater than a diameter of the bore.

* * * * *